(12) United States Patent
Haws

(10) Patent No.: US 7,389,961 B1
(45) Date of Patent: Jun. 24, 2008

(54) HOSE OUTLET SUPPORT BRACKET

(76) Inventor: Floyd Haws, 8482 Joe Rodgers Rd., Granite Bay, CA (US) 95746

( * ) Notice: Subject to any disclaimer, the term of this patent is extended or adjusted under 35 U.S.C. 154(b) by 0 days.

(21) Appl. No.: 11/600,485

(22) Filed: Nov. 15, 2006

(51) Int. Cl.
*A62C 13/76* (2006.01)
(52) U.S. Cl. .............................. 248/75; 248/78; 248/80; 138/110; 239/275
(58) Field of Classification Search ............. 248/75–93; 138/110, 108, 106, 109, 103; 239/275, 273, 239/282, 283
See application file for complete search history.

(56) References Cited

U.S. PATENT DOCUMENTS

| 851,375 | A | * | 4/1907 | Raymond | ..................... 248/49 |
|---|---|---|---|---|---|
| 1,156,145 | A | * | 10/1915 | Jenkins | ......................... 285/64 |
| 2,133,020 | A | * | 10/1938 | Fehrenbach | .................. 248/75 |
| 2,139,742 | A | * | 12/1938 | Fralick | ......................... 248/65 |
| 2,147,124 | A | * | 2/1939 | Litle, Jr. | ...................... 251/147 |
| 2,153,290 | A | | 4/1939 | Ansorge | |
| 2,216,149 | A | | 10/1940 | Weiss | |
| 2,372,674 | A | * | 4/1945 | Jordan | .......................... 248/65 |
| 2,687,329 | A | * | 8/1954 | Hunter | ....................... 239/282 |
| 2,943,833 | A | | 7/1960 | Ramse | |
| 3,753,292 | A | * | 8/1973 | Hutson | ......................... 433/96 |
| 3,897,923 | A | * | 8/1975 | Paepke et al. | ................. 248/75 |
| 4,151,864 | A | | 5/1979 | Thurman | |
| 4,249,529 | A | * | 2/1981 | Nestor et al. | ............ 128/207.17 |
| 4,372,511 | A | * | 2/1983 | Knowles | ..................... 248/68.1 |
| 4,433,821 | A | * | 2/1984 | Bolding et al. | ................. 248/65 |
| 4,550,892 | A | | 11/1985 | Whitley | |
| 5,678,609 | A | * | 10/1997 | Washburn | ..................... 138/107 |
| 5,939,680 | A | * | 8/1999 | Gretz et al. | ................... 174/135 |
| 6,059,215 | A | | 5/2000 | Finnis | |
| 6,467,734 | B1 | * | 10/2002 | Brown et al. | ................... 248/65 |
| 6,959,139 | B2 | * | 10/2005 | Erwin et al. | ................. 385/134 |
| 7,090,154 | B2 | * | 8/2006 | Herring | ........................ 239/569 |
| 2002/0074462 | A1 | | 6/2002 | Pontecorvo | |
| 2004/0143897 | A1 | | 7/2004 | Kollmann | |
| 2007/0001080 | A1 | * | 1/2007 | Marioni | .................... 248/309.1 |

* cited by examiner

*Primary Examiner*—Kimberly Wood
(74) *Attorney, Agent, or Firm*—Heisler & Associates

(57) ABSTRACT

A support bracket is provided for holding an outlet end of a hose, such as a garden hose. The bracket includes a base which is adapted to be attached to a support surface, such as an exterior wall of a building. An arch extends away from an upper end of the base to a free end spaced from the base. A channel passes along the base and the arch. The channel is adapted to receive the hose therein. The arch terminates at a head which holds an outlet of the hose. The head extends at least partially downwardly so that water discharged from the outlet of the hose extends at least partially downwardly when the hose is supported by the bracket. Retainer ribs are provided to facilitate removable attachment of the hose within the channel of the bracket.

18 Claims, 2 Drawing Sheets

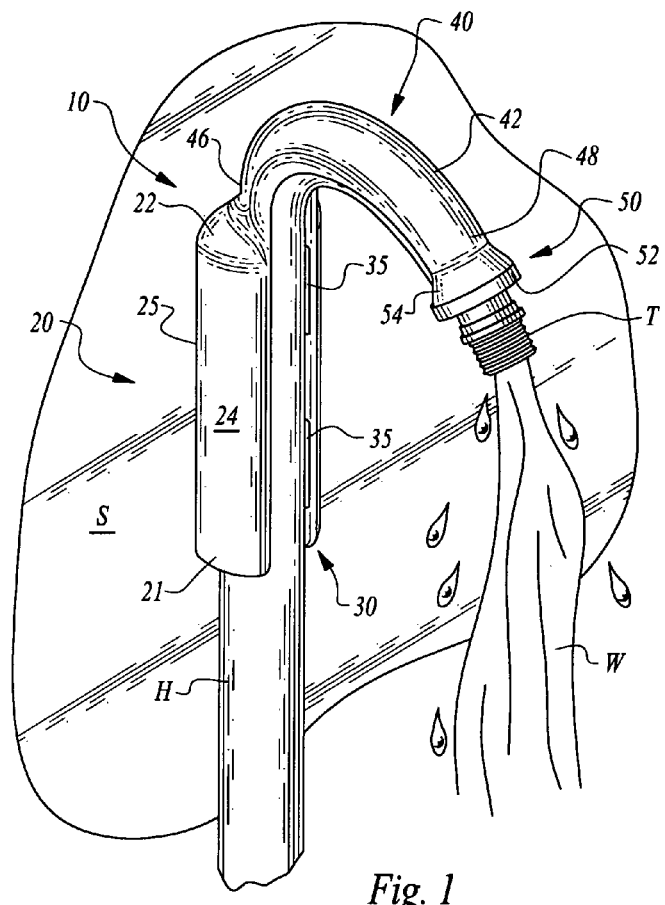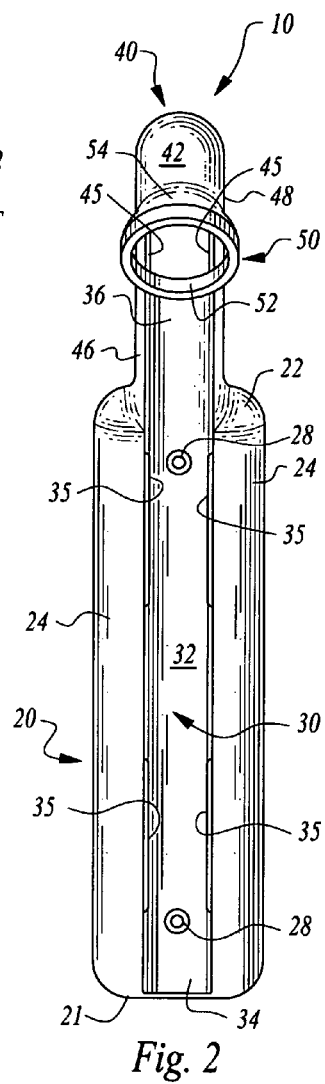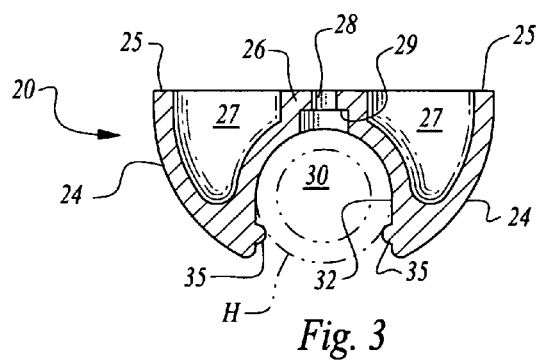
Fig. 1
Fig. 2
Fig. 3

HOSE OUTLET SUPPORT BRACKET

FIELD OF THE INVENTION

The following invention relates to brackets for supporting a garden hose. More particularly, this invention relates to brackets which can mount to a planar vertical surface, such as an exterior wall of a building, and which can hold the outlet end of the hose in an at least partly downwardly facing direction, so that the hose acts somewhat akin to a faucet when the hose is placed in the support bracket.

BACKGROUND OF THE INVENTION

Garden hoses are commonly used to provide convenience in delivering water in a region proximate to a hose bib or other water supply outlet. For instance, residential dwellings often have a water supply associated therewith which features one or more hose bibs either extending through a wall of the dwelling or extending up out of the ground adjacent to a wall of the dwelling. The hose bib has a valve and associated valve handle and a threaded outlet port. A garden hose can be conveniently coupled to this outlet port so that when the valve is opened, water is released from an outlet of the hose. Once so arranged, water can be delivered to any region as close to the hose bib as a length of the hose (typically fifty or one hundred feet). In this way, planting beds around the residence can be watered, animals can be watered, cars can be cleaned, and other outdoor water needs can be met.

One common use for a garden hose is for an individual to clean up, particularly when the individual wishes to return into the residence and has become somewhat soiled. At other times, an individual may wish to remove soil from the individual's hands or other objects after working in the dirt or otherwise having the individual's hands become dirty.

A typical prior art garden hose and hose bib are not particularly effective for washing an individual's hands or other objects. A typical hose bib is usually one to two feet above the ground. If the hose is removed and the hose bib used as a "faucet" for hands washing, or washing of other items, the user has to hunch down significantly to place ones hands (or items) under the hose bib. When the garden hose is attached, the user faces the dilemma of requiring one hand for holding the hose and so only being able to wash hands one at a time (or only having one hand available to hold the item to be cleaned). This is particularly troublesome when soap is to be used to more thoroughly wash the individual's hands.

Various types of hose retainers are known in the art which facilitate storage of a hose off of the ground, such as rolled up on a reel, or merely wrapped around a hose support extending from a support surface such as an outer wall of the adjacent building. However, such supports in the prior art are not known to conveniently hold the outlet end of the hose in a proper fashion so that the outlet end of the hose can function as a faucet, such as for hands washing. Accordingly, a need exists for a support bracket which can hold an outlet end of the hose in fixed position relative to an adjacent support surface and with the outlet end of the hose angled downwardly at least slightly so that the hose can be conveniently used for hand washing, or washing of other items.

SUMMARY OF THE INVENTION

With this invention a support bracket is provided which can readily mount to a support surface such as a vertically oriented outer wall of a residence or other structure adjacent to where a hose bib or other water source is provided for hose attachment. The support bracket has a base which is adapted to be mounted to the support surface. A channel extends through at least a portion of the base. The channel is sized slightly larger than a diameter of the hose so that the hose can be routed through the channel. An arch preferably extends from an upper end of the base which curves away from the support surface to which the base is attached. The arch can be rigidly formed with the base or attached to the base, or alternatively be pivotably attached to the base to facilitate swiveling of the hose outlet to various positions. The channel continues from the base and along the arch, with the channel ending at a terminus at an end of the arch most distant from the base. This terminus preferably extends at least partially downward when the base is coupled to the adjacent support surface. A head is located at a free end of the arch and adjacent the terminus of the channel. This head preferably includes a ring for holding the hose adjacent an outlet thereof.

The channel includes a means to hold the hose within the channel, most preferably in the form of pairs of retainer ribs. These retainer ribs extend toward each other and are spaced forward of a centerline of the channel. The retainer ribs are closer to each other than a diameter of the hose so that once the hose has been inserted between the retainer ribs and into alignment with a centerline of the channel, the retainer ribs keep the hose from returning back out of the channel (unless the hose is compressed). The hose can be readily inserted into the channel or removed from the channel, such as when the bracket is to be put into service or when the hose is to be used separate from the bracket.

OBJECTS OF THE INVENTION

Accordingly, a primary object of the present invention is to provide a support bracket for holding an outlet end of a hose so that a user can wash various items without needing to also hold the hose.

Another object of the present invention is to provide a support bracket which allows a hose to be easily removably attached and detached from the support bracket near an outlet of the hose.

Another object of the present invention is to provide a hose outlet and support bracket which can readily mount to a support surface from which the hose is to be deployed.

Another object of the present invention is to provide a support bracket for an outlet end of the hose which orients the outlet of the hose facing at least partially downwardly and which supports the hose to prevent kinking of the hose.

Another object of the present invention is to provide a support bracket for a hose which is easy to manufacture from readily available materials and easy to install.

Other further objects of the present invention will become apparent from a careful reading of the included drawing figures, the claims and detailed description of the invention.

BRIEF DESCRIPTION OF THE DRAWINGS

FIG. 1 is a perspective view of the support bracket of this invention installed upon a vertical support surface and with a hose coupled thereto, and with water being delivered from an outlet of the hose, such as for washing of various items in a hands-free manner.

FIG. 2 is a front elevation view of the support bracket of this invention without the hose shown therewith.

FIG. 3 is a top plan view of the support bracket of this invention shown in full section and with the hose shown in broken lines.

DESCRIPTION OF THE PREFERRED EMBODIMENT

Figures 4, 5:
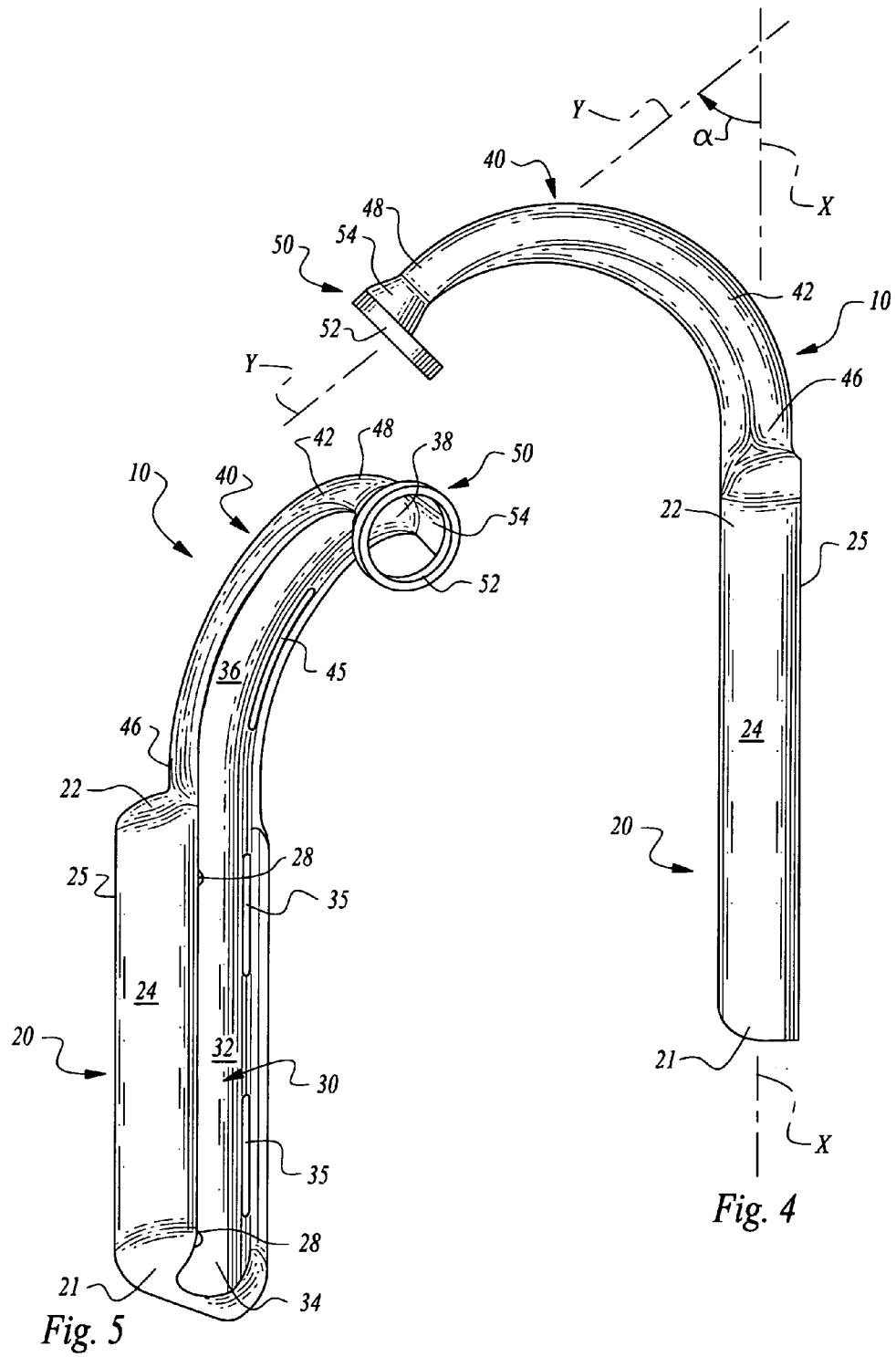
FIG. 4 is a side elevation view of that which is shown in FIG. 2.
FIG. 5 is a perspective view of that which is shown in FIG. 2.

Referring to the drawings, wherein like reference numerals represent like parts throughout the various drawing figures, reference numeral 10 is directed to a bracket (FIG. 1) for supporting an outlet T of a hose H relative to a support surface S to which the bracket 10 is mounted. With the hose H supported by the bracket 10, water W can be released from the outlet T of the hose H in a mostly downwardly direction (akin to that of a faucet) so that water W is delivered in a hands-free manner.

In essence, and with particular reference to FIG. 5, basic details of the bracket 10 are described. The bracket 10 is preferably a monolithic structure including a base 20 which is adapted to be mounted to the support surface S (FIG. 1). The base 20 supports a channel 30 which is adapted to receive the hose H (FIG. 1) passing therethrough. The channel 30 extends out of the base 20 and into an arch 40. The arch 40 is preferably coupled to the base 20 and extends away from a plane in which the support surface S is oriented (when the base 20 is mounted to the support surface S, as shown in FIG. 1).

The arch 40 preferably maintains a curve which is sufficiently gradual so that the channel 30 can support the hose H therein without kinking of the hose H. The arch 40 terminates at a head 50. The head 50 is adapted to support the outlet T of the hose H as it reaches a terminus 38 of the channel 30. The channel 30 includes retainer ribs 35 and curving ribs 45 which act as a preferred form of a means to hold the hose H within the channel 30 in a removably attachable fashion. Holes 28 are placed in the base 20 for convenient mounting of the base 20 to the support surface S through the utilization of appropriate fasteners.

More specifically, and with particular reference to FIGS. 2 and 3, details of the base 20 are described. The base 20 is preferably a unitary mass of rigid material which is preferably lightweight for convenience in manufacturing and shipping, and sufficiently strong to support the weight of a few feet of hose H and associated minor stresses associated with the utilization of the bracket 10 according to this invention. For instance, the base 20 could be formed of injection moldable plastic, such as polyethylene or other suitable polymeric hydrocarbon materials, or stamped or otherwise formed out of aluminum or other light metals. Wall thicknesses can be selected to be sufficiently thick to avoid bending at highest stress locations on the base 20 or other portions of the bracket 10.

The base 20 also supports the arch 40 extending from the upper end 22 of the base 20. A lower end 21 of the base 20 defines a lowermost portion of the base 20 with the upper end 22 defining an uppermost portion of the base 20. Side walls 24 preferably curve slightly to avoid sharp edges and to provide a desirable aesthetic appearance. Rear edges 25 define a transition between the side walls 24 and a rear wall 26.

The rear wall 26 is preferably not continuous (FIG. 3) but rather includes cavities 27 therein. These cavities 27 are provided to facilitate injection molding, stamping or other formation of the base 20 within a minimum of material required. The cavities 27 could be dispensed with, particularly if the base 20 were formed from a manufacturing technique such as machining, and if the material to otherwise be saved were not of sufficient value. A mid-portion of the rear wall 26 is preferably aligned with the rear edges 25 so that together the rear wall 26 is defined. This rear wall 26 is preferably planar and defines a portion of the base 20 which is adapted to abut a planar support surface S or other structure to which the bracket 10 is to be attached. Such other support surfaces S could include a side of a post extending up from the ground, formed of metal or wood or other materials, or could be a side wall of a building, such as a residence or other structure.

Holes 28 preferably pass through a mid-portion of the center wall 26 adjacent the channel 30. These holes 28 are sized to receive fasteners, such as screws, passing therethrough and into the support surface S. Shoulders 29 are preferably provided around the holes 28. These shoulders 29 provide a region in which a head of a screw or other fastener can reside, so that the head does not extend into the channel 30 where it could damage the hose H.

While fasteners such as screws are preferably provided as a preferred form of a means to attach the base 20 to the support surface S, other attachment means could include adhesive on the rear wall 26 of the base 20, or magnetic fasteners, or other fasteners such as suction cups (particularly where the support surface S is formed of glass or other smooth materials), clips, clamps, rivets, nails, and any other fasteners suitable for mounting the base 20 to the support surface S.

The base 20 is preferably somewhat elongate between the lower end 21 and the upper end 22. In this way, the base 20 is easily able to handle any torques associated with forces of water W flow through the hose H as well as gravity loads acting down on the base 20 through the weight of the bracket 10 itself and the weight of the hose H. The base 20 preferably supports a portion of the channel 30 therein. However, it is conceivable that the channel 30 could be entirely supported within the arch 40 with the base 20 merely provided to support the arch 40.

In this preferred embodiment, the channel 30 extends entirely from the lower end 21 of the base 20 to the upper end 22 of the base 20. The channel 30 is primarily defined by a cylindrical surface 32 which has a diameter slightly greater than that of the hose H and which is preferably openly accessible on a forward side. Brackets 10 having channels 30 of different sizes could be provided to accommodate hoses H having different diameters. Alternatively, the channel 30 could be sized similar to a largest diameter hose H and have retainer ribs 35 and curving ribs 45 sized so that smaller diameter hoses H could still be accommodated.

The channel 30 includes a bottom 34 adjacent the lower end 21 and defining a lowermost portion of the channel 30. The hose H typically extends vertically up into the channel 30 through the bottom 34 with the channel 30 then extending along a vertical central axis of the channel 30 up to an upper end 22 of the base 20 where the channel transitions from extending along a linear central axis to extending along a curving axis within the arch 40.

The channel 30 is defined by a toroidal surface 36 within the arch 40, with a curvature of this toroidal surface 36 having a radius of between about two inches and six inches, with the radius most preferably being about three inches. This radius has been found to be sufficiently large so that the hose H avoids kinking when following the channel 30 along the toroidal surface 36, and sufficiently short so that the arch 40 need not extend too far away from the support surface S when the bracket 10 is mounted to the support surface S. With the arch 40 having a radius of curvature of about three inches, the arch 40 extends a total distance of about four inches away from the rear wall 26 of the base 20. These dimensions can be adjusted for hoses H having different diameters and different flexibilities, and to otherwise optimize convenience and usefulness of the bracket 10 of this invention.

The toroidal surface 36 extends to a terminus 38 at a free end 48 of the arch 40 (FIG. 5). The toroidal surface 36 preferably has a cross-dimensional diameter (perpendicular to a length of the arch 40) similar to that of the channel 30 within the base 20. The channel 30 is continuous between portions of the channel 30 within the base 20 and portions of the channel 30 within the arch 40, and with a gradual transition between the base 20 and the arch 40. The entire channel 30 is preferably open on a forward side thereof (and lower side of the arch 40). While the channel 30 could conceivably be closed (so that the hose H would need to have its outlet T threaded up through the bottom 34 until it extends out at the terminus 38 adjacent the free end 48 of the arch 40), keeping the channel 30 with its forward portion open allows the hose H to be conveniently inserted into the channel 30 laterally.

To keep the hose H within the channel 30, retainer ribs 35 are provided (FIG. 3) which extend toward each other from opposite sides of the cylindrical surface 32 and near a forward most portion of the channel 30. These retainer ribs 35 extend toward each other sufficiently so that they have a distance away from each other less than a diameter of a hose H that the bracket 10 is adapted to hold. Thus, when the hose H is inserted laterally into the channel 30, it must be flexed to a lesser diameter to get past the retainer ribs 35. Once the hose H has passed the retainer ribs 35 it can return to its full diameter and be held within the channel 30 by the retainer ribs 35. Typical hoses H are rather flexible, but become stiffer once water pressure is encountered through passage of water W through the hose H (FIG. 1). In this way, the retainer ribs 35 can readily hold the hose H within the channel 30, but when the water is off, the hose H can be readily removed from the channel 30 by merely compressing the hose H somewhat and allowing it to pass back through the retainer ribs 35.

In a similar fashion, the curving ribs 35 are provided on portions of the toroidal surface 36 of the channel 30 where the channel 30 is created within the arch 40. These curving ribs 45 curve with a radius of curvature similar to that of the arch 40 and toroidal surface 36 and function in a similar manner to the retainer ribs 35 to hold the hose H within the toroidal portion of the channel 30. Note that inserting the hose H into this toroidal portion requires that the user initially start with a larger amount of hose length so that as the hose is pressed past the curving ribs 45 and encounters the full circumferential length of the channel 30 as it passes along the arch 40, that sufficient amount of hose H is available so that the outlet T can still pass through the head 50 at the free end 48 of the arch 40. Most conveniently, the outlet T of the hose H can first be passed through the head 50 and then successive portions of the hose H from the outlet T can be inserted into the portions of the channel 30 within the arch 40 and then portions of the channel 30 within the base 20, to complete the hose H installation process.

The arch 40 is preferably a rigid unitary mass of material formed along with the base 20. Optionally, the arch 40 could be formed as a separate structure and then attached to the base 20 in a rigid fashion. Another option, would be to allow the arch 40 to be somewhat flexible, such as to pivot from side to side for convenient redirection of water W discharged from the outlet T of the hose H, or to allow folding of the arch 40 so that it is closer to the support surface S when the bracket 10 is not in use.

The arch 40 includes a base end 46 where the arch 40 is coupled to the base 20. A free end 48 defines a portion of the arch 40 most distant from the base end 46. An outer surface 42 is preferably of curving toroidal form, but could have a variety of different appearances. A portion of the arch 40 facing downwardly is preferably open to facilitate access into the channel 30 with the hose H.

If the arch 40 is to pivot relative to the base 20, the base end 46 would be formed with a swiveling joint coupling it to the upper end 22 of the base 20 with a centerline of this swiveling joint preferably aligned with a centerline of the channel 30 within the base 20. Thus, portions of the hose H within the base 20 could merely rotate within the base 20 without being removed from the channel 30, and with portions of the hose H above the base 20 remaining more firmly grasped within the portions of the channel 30 within the arch 40. In such an arrangement, the curving ribs 45 could be provided with a slightly larger size to more firmly grasp the hose H with the retainer ribs 35 associated with portions of the channel 30 within the base 20 slightly looser to facilitate hose H rotation. Most preferably however, the entire arch 40 is merely formed rigidly along with the base 20 from common materials to facilitate easy manufacture and simplicity of a preferred embodiment of this invention.

The arch 40 terminates at the free end 48 with the head 50. The head 50 preferably includes a ring 52 and a flair 54 which supports the ring 52 off of the free end 48 of the arch 40. The ring 52 preferably completely circumscribes a centerline along which the hose H is to be routed. The outlet T of the hose H preferably passes through this ring 52 and the ring 52 helps to support the outlet T so that it cannot move significantly when water W is directed out of the outlet T. The flair 54 is a somewhat frustoconical section of the arch 40 adjacent the free end 48 which joins the arch 40 to the ring 52. The flair 54 is provided so that a diameter of the arch 40 can increase slightly between the free end 48 and the ring 52. The ring 52 is rigidly coupled to the arch 40 so that the outlet T of the hose H is held firmly along with the arch 40 and base 20 to the support surface S.

The free end 48 of the arch 40 preferably curves at a constant radius of curvature from the base end 46 to the free end 48. However, the arch 40 could have a variety of different configurations which would not involve a constant radius of curvature and which could include various straight sections. The free end 48 of the arch 40 preferably extends at an angle which is tangent to a line (referred to as the ring axis Y) which is non-horizontal and with the free end 48 pointing at least partially downwardly when the rear wall 26 of the base 20 is oriented in a vertical plane, such as adjacent the support surface S when the support surface S is oriented in a vertical plane. In this way, water W discharged from the hose H when it is held by the head 50 at the free end 48 of the arch 40 extends at least partially downwardly.

Most preferably, the ring axis Y passing through the ring 52 of the head 50, and which approximates a direction of water W discharge, is spaced from a vertical axis X aligned with a centerline of the channel 30 within the base 20 (and parallel with the rear wall 26 of the base 20) by an angle $\alpha$ which is less than 90° (FIG. 4). In this way, water W passes at least partially downwardly from the outlet T. Most preferably, this angle $\alpha$ measures 60°. It is conceivable that the angle $\alpha$ could be as low as zero, so that the water W discharged from the outlet T of the hose H would be directed vertically downward.

Other conceivable variations on this invention which are not included in this preferred embodiment include configuring the base 20 so that it can be supported directly by the ground, such as by including a stake extending downwardly from the lower end 21 of the base 20 which can be driven directly into the ground or which can rest upon a stable horizontal ground surface with an appropriately stable foot, so that the bracket 10 becomes a free standing structure or a structure which can be driven into the ground somewhat and supported by the ground directly. In such an embodiment, no attachment to a support surface would be required and associated attachment details of the bracket 10 could be dispensed with.

Another modification to the preferred embodiment of this invention would be to include upon the base 20 or other portions of the bracket 10 accessories such as a substantially horizontal shelf upon which soap or other items could rest, or hooks from which a wash rag or towel could be deployed. Such accessories could be fastened to the base 20, such as off of the side walls 24, or formed along with the base 20 during the manufacturing process.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A combination garden hose and support for a outlet end of the garden hose, the combination comprising:
    an elongate flexible garden hose having the outlet end adapted to discharge a stream of water therefrom;
    a base having a rear portion adapted to be attached to a support surface;
    a channel formed in said base on a portion of said base spaced from said rear portion;
    said channel having a bottom below a terminus;
    said channel adapted to receive said elongate flexible garden hose extending from said bottom to said terminus;
    an arch above said base;
    said arch at least partially curved and rigidly coupled to said base;
    said channel extending along at least a portion of said arch; and
    means to hold said garden hose within said channel;
    wherein said terminus of said channel includes a ring, said ring completely circumscribing a centerline of said channel, said ring affixed to said channel, said ring having a greater diameter than a diameter of said outlet end of said garden hose said channel is adapted to receive;
    said ring having a greater radius of curvature than said channel at said arch; and
    said ring fixed to said arch of said channel through a flair having a lesser radius adjacent said arch and a greater radius adjacent said ring.

2. The support of claim 1 wherein said rear portion of said base is substantially planar.

3. The support of claim 2 wherein said channel extends substantially linearly, substantially parallel with said rear portion within said base and curving away from said rear portion within said arch.

4. The support of claim 3 wherein said channel exhibits an at least partially circular cross-section sized to be at least as large in diameter as a diameter of the elongate flexible hose which said channel is adapted to receive.

5. The support of claim 4 wherein said holding means includes at least one pair of retainer ribs within said channel and extending at least partially toward each other, said retainer ribs located closer to each other than a diameter of said channel, said retainer ribs spaced from a centerline of said channel.

6. The support of claim 5 wherein said holding means includes at least two pairs of retainer ribs with one pair of said retainer ribs extending linearly and located within said base and one pair of said retainer ribs having a curving form and located within said arch.

7. The support of claim 1 wherein said arch curves from said base to said terminus, said terminus extending at an angle below horizontal when portions of said channel adjacent said bottom are oriented substantially vertically.

8. The support of claim 7 wherein said terminus extends along an angle which is at least as low as 60° from vertical.

9. The support of claim 1 wherein said channel is oriented entirely within a plane.

10. The support of claim 9 wherein said channel remains perpendicular to said rear portion of said base from said bottom of said channel to said terminus of said channel.

11. A garden hose and garden hose outlet support bracket, comprising in combination:
    an elongate flexible garden hose having an outlet end adapted to discharge a stream of water therefrom;
    a base having a substantially planar rear portion adapted to be attached to a substantially planar vertically oriented support surface;
    a channel coupled to said base, said channel adapted to hold at least a portion of said garden hose removably attachable to said channel;
    said channel curving away from a plane in which said planar rear portion of said base is oriented forming an arch, said channel extending to a terminus spaced from said base;
    wherein said terminus of said channel includes a ring, said ring completely circumscribing a centerline of said channel, said ring affixed to said channel, said ring having a greater diameter than a diameter of said outlet end of said garden hose said channel is adapted to receive;
    said ring having a greater radius of curvature than said channel at said arch; and
    said ring fixed to said arch of said channel through a flair having a lesser radius adjacent said arch and a greater radius adjacent said ring.

12. The bracket of claim 11 wherein said channel is partially located within said base and partially located within the arch extending from an upper end of said base, said arch curving to support a curving portion of said channel.

13. The bracket of claim 12 wherein said channel is linear within said base.

14. The bracket of claim 12 wherein said channel curves to a terminus most distant from said base, said channel extending below horizontal adjacent said terminus.

15. The bracket of claim 14 wherein said channel curves to an angle at least as little as 60° away from said substantially planar rear portion of said base.

16. The bracket of claim 11 wherein holes are provided within said base, said holes adapted to receive fasteners passing therethrough and into the substantially planar vertically oriented support surface.

17. The bracket of claim 11 wherein said channel includes retainer ribs paired into at least one pair, each pair of said retainer ribs oriented on opposite sides of said channel and facing each other with a distance between said retainer fibs less than a diameter of said channel, such that a hose with a diameter less than that of said channel and greater than a distance between said retainer ribs is retained within said channel.

18. The bracket of claim 17 wherein said channel is partially located within said base and partially located within an arch coupled to said base and extending from an upper end of said base, said arch curving to support a curving portion of said channel;

wherein said channel is linear within said base; and wherein at least one pair of linear retainer ribs are located within said base and at least one pair of curving retainer ribs are located within said channel at said arch.

\* \* \* \* \*